United States Patent
Rogers et al.

(10) Patent No.: US 7,065,414 B2
(45) Date of Patent: Jun. 20, 2006

(54) METHODS AND APPARATUS FOR OPERATING PRODUCTION FACILITIES

(75) Inventors: Paul Matthew Rogers, Pleasanton, CA (US); James Andrew Maxson, Berkeley, CA (US); Ilga Celmins, Aptos, CA (US)

(73) Assignee: General Electric Company, Schenectady, NY (US)

( * ) Notice: Subject to any disclaimer, the term of this patent is extended or adjusted under 35 U.S.C. 154(b) by 578 days.

(21) Appl. No.: 10/385,066

(22) Filed: Mar. 10, 2003

(65) Prior Publication Data

US 2004/0181298 A1    Sep. 16, 2004

(51) Int. Cl.
*G05B 13/02* (2006.01)

(52) U.S. Cl. .................. 700/36; 700/28; 700/33; 700/37; 700/281; 700/287; 702/82; 702/61; 702/62; 702/181; 702/182

(58) Field of Classification Search ............ 700/28–33, 700/36–37, 49, 51, 287, 291, 295, 289, 281, 700/288; 702/182, 187, 188, 61, 62; 705/1, 705/10, 22, 8, 2

See application file for complete search history.

(56) References Cited

U.S. PATENT DOCUMENTS

| | | | | |
|---|---|---|---|---|
| 3,913,829 A * | 10/1975 | Fink | ............................ | 705/412 |
| 4,051,998 A * | 10/1977 | Zabel | ......................... | 705/413 |
| 4,267,571 A | 5/1981 | Cohn | | |
| 4,455,614 A | 6/1984 | Martz et al. | | |
| 4,805,114 A | 2/1989 | Putman et al. | | |
| 5,249,120 A * | 9/1993 | Foley | ............................. | 705/1 |
| 5,621,654 A | 4/1997 | Cohen et al. | | |
| 5,630,070 A * | 5/1997 | Dietrich et al. | ................ | 705/8 |
| 6,122,603 A | 9/2000 | Budike, Jr. | | |
| 6,243,611 B1 * | 6/2001 | Hazama et al. | ............... | 700/97 |
| 6,256,624 B1 * | 7/2001 | Pollard et al. | .................. | 707/3 |
| 6,311,105 B1 | 10/2001 | Budike, Jr. | | |
| 6,826,538 B1 * | 11/2004 | Kalyan et al. | ................. | 705/7 |
| 2003/0018503 A1 * | 1/2003 | Shulman | ....................... | 705/7 |
| 2003/0055677 A1 * | 3/2003 | Brown et al. | .................. | 705/1 |
| 2004/0049369 A1 * | 3/2004 | Konicek et al. | ................. | 703/7 |
| 2004/0199294 A1 * | 10/2004 | Fairlie et al. | ............... | 700/266 |
| 2005/0114201 A1 * | 5/2005 | Walsh et al. | .................. | 705/10 |

* cited by examiner

*Primary Examiner*—Ramesh Patel
(74) *Attorney, Agent, or Firm*—Armstrong Teasdale LLP

(57) ABSTRACT

A method and apparatus for operating a production system that includes a plurality of production facilities is provided. The method includes receiving, in real-time, for each facility, cost data for a first resource used by each respective facility to produce an output, receiving, in real-time, for each facility, cost data for a second resource used by each respective facility to produce the output, determining, in real-time; an automated incremental cost curve for the system based on a level of production of each facility and the received resource cost data, and determining a production output target for each production facility to achieve an optimum production system output based on the real-time incremental cost curves. The system includes at least one production facility that includes a software code segment programmed to determine, in real-time, an incremental cost of a first resource based on a level of production of each respective facility.

30 Claims, 6 Drawing Sheets

METHODS AND APPARATUS FOR OPERATING PRODUCTION FACILITIES

BACKGROUND OF THE INVENTION

This invention relates generally to the control of production facilities, and more particularly to a system for optimizing the output of a system of production facilities.

At least some known production systems include a plurality of production facilities that operate in parallel such that each facility receives production resources independently of the other facilities in the system. The output of such production facilities may be linked via a common stream of commerce. For example, an electric utility may have a plurality of independent generating facilities located throughout a territory. Each generating facility may receive fuel from independent suppliers and the output of each facility may be coupled through a common transmission system or grid, such that, if one facility became unable to deliver a required output to the grid, another facility should be able to increase its output to accommodate for the shortfall. This process is nearly transparent to users or customers of the grid.

Each facility may have operating characteristics that are different than each other facility in the production system, such that the operating efficiency of each facility may be different than the operating efficiency of every other facility. Operating efficiency may be defined in terms of the utilization of resources per unit of output. For example, within an electric utility, although several resources, such as fuel, labor, emissions allowances, and water may be used to generate power, improving the efficiency of each facility's use of fuel may cause the largest impact to the economical generation of electricity as a whole. Ideally, each facility may be operated individually to facilitate maximizing the facility efficiency, or to generate the production output using the least amount of resources. However, to increase the operating efficiency of the production system, each individual facility may be operated to facilitate maximizing the efficiency of the production system, which may not be the same as operating each facility at its individual optimum efficiency level.

Accordingly, to facilitate maximizing the efficiency of the production system, at least some known power production systems attempt to dispatch power generating facilities in an economical manner by adjusting load on each facility to facilitate attaining the highest system-wide efficiency possible. Such systems utilize testing methods to determine a cost of resource inputs required at each level of production output of each facility to develop an economic dispatch curve for the production system.

Testing of facility components is periodically conducted under various conditions to develop individual component efficiency curves, which are used to develop the economic dispatch curves. More specifically, testing of the production facility is conducted periodically to verify the correctness of component efficiency to overall facility efficiency assumptions. However, due to the periodic scheduling of efficiency testing, the validity of the testing results and the assumptions underlying the efficiency calculations may only be reliable for a short time period until the tests are run again. For example, various causes of uncertainty may undesirably introduce misleading data into calculations relied upon to achieve optimal production system dispatch, which as a result may produce inefficient system operations. Testing components and testing the facility at shortened intervals may improve economic dispatch curves, but testing is labor intensive may require operational limits on the facility during the time period the testing is taking place.

BRIEF DESCRIPTION OF THE INVENTION

In one aspect, a method for operating a production system that includes a plurality of production facilities is provided. The method includes receiving, in real-time, for each facility, cost data for a first resource used by each respective facility to produce an output, receiving, in real-time, for each facility, cost data for a second resource used by each respective facility to produce the output, determining, in real-time; an automated incremental cost curve for the system based on a level of production for each facility and the received resource cost data, and determining a production output target for each production facility to achieve an optimum production system output based on the real-time incremental cost curves.

In another aspect, a production system for producing an output is provided. The system includes at least one production facility that includes a first resource receiving system, and a second resource configured to control and utilize the first resource in a production process, and a computer system that includes a software code segment programmed to determine, in real-time, an incremental cost of the first resource based on a level of production of the facility.

In yet another aspect, a software code segment for controlling a computer to determine, in real-time, an incremental cost of operating a plurality of production facilities is provided. The determination is based on a first resource input and a second resource utilization of the first resource, and the incremental cost is based on a level of production of each facility. The segment includes a fuel tracking module programmed for tracking at least one of real-time fuel cost, real-time fuel flow, and real time fuel quality for each facility, a process component tracking module for modeling facility components to generate real-time heat rate curves for each facility, and a dispatch decision module programmed to receive inputs from at least one of said fuel tracking module, said process component tracking module, and said dispatch decision module configured to generate real-time system dispatch cost curves.

DETAILED DESCRIPTION OF THE INVENTION

Figure 1:
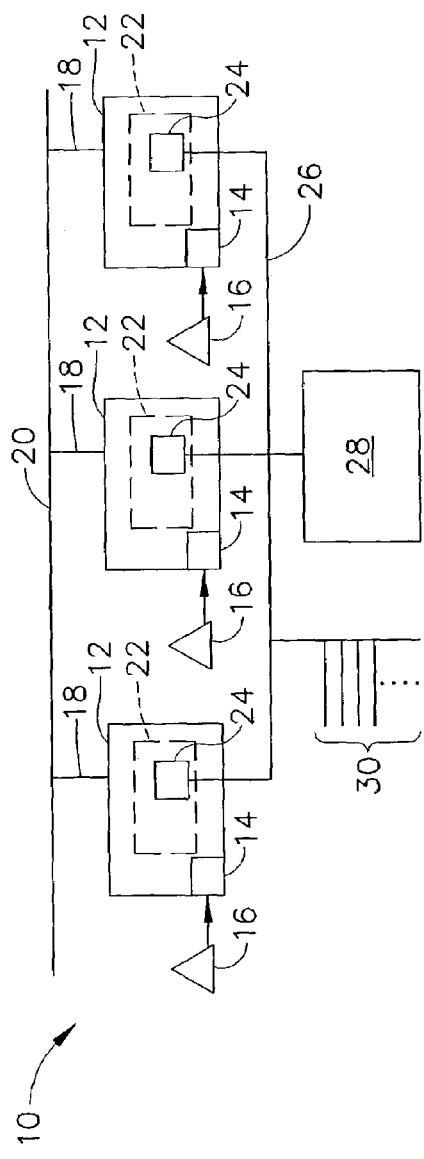
FIG. 1 is a schematic diagram of an exemplary production system.

FIG. 1 is a schematic diagram of an exemplary production system 10 that includes at least one production facility 12 that includes a receiving system 14 for supplying a first resource 16, such as coal, to facility 12. In the exemplary embodiment, facility 12 is a coal-fired power generation plant that receives coals from a plurality of sources. Each facility 12 may have different operating characteristics from each other facility 12, including, but not limited to, facility production capability, efficiency, and availability. Each facility 12 also includes a production output 18 that is coupled to a transmission system 20. In the exemplary embodiment, outputs 18 are transmission wires that connect each facility 12 a transmission system, or grid 20. In an alternative embodiment, output 18 may be a pipeline for transporting liquid or gaseous produced goods. In another alternative embodiment, each output 18 may be a transport system for transporting discrete produced goods through a vehicle-based transport system.

Each facility 12 includes a plurality of second resources 22, which controls and utilizes the received first resources 16 to produce a production output. For example, in the exemplary embodiment, secondary resources 22 include, but are not limited to, boilers, pumps, condensers, conveyors, a distributed control systems (DCS) 24, and electrical switchgear. Resources 22 are monitored and controlled from DCS 24, which receives inputs from resources 22, provides indications for facility operators, and transmits commands to resources 22 to control the operation thereof. In the exemplary embodiment, each DCS 24 is communicatively coupled through a network 26 to a central computer 28. In one embodiment, network 26 is communicatively coupled to at least one remote client for monitoring, modifying and controlling the operation of system 10.

In operation, each facility receives first resource 16, which is utilized by second resources 24 to produce a production output. The production process is monitored and controlled by DCS 24 and may use additional resources. A product is then transmitted through output 18 to a transmission system that carries the product away from facility 12 into a stream of commerce. By-products and any waste produced within the production process are also monitored and controlled by DCS 24. Pollutants released during the production process are monitored by DCS 24 or other associated systems (not shown) to account for their release.

Figure 2:
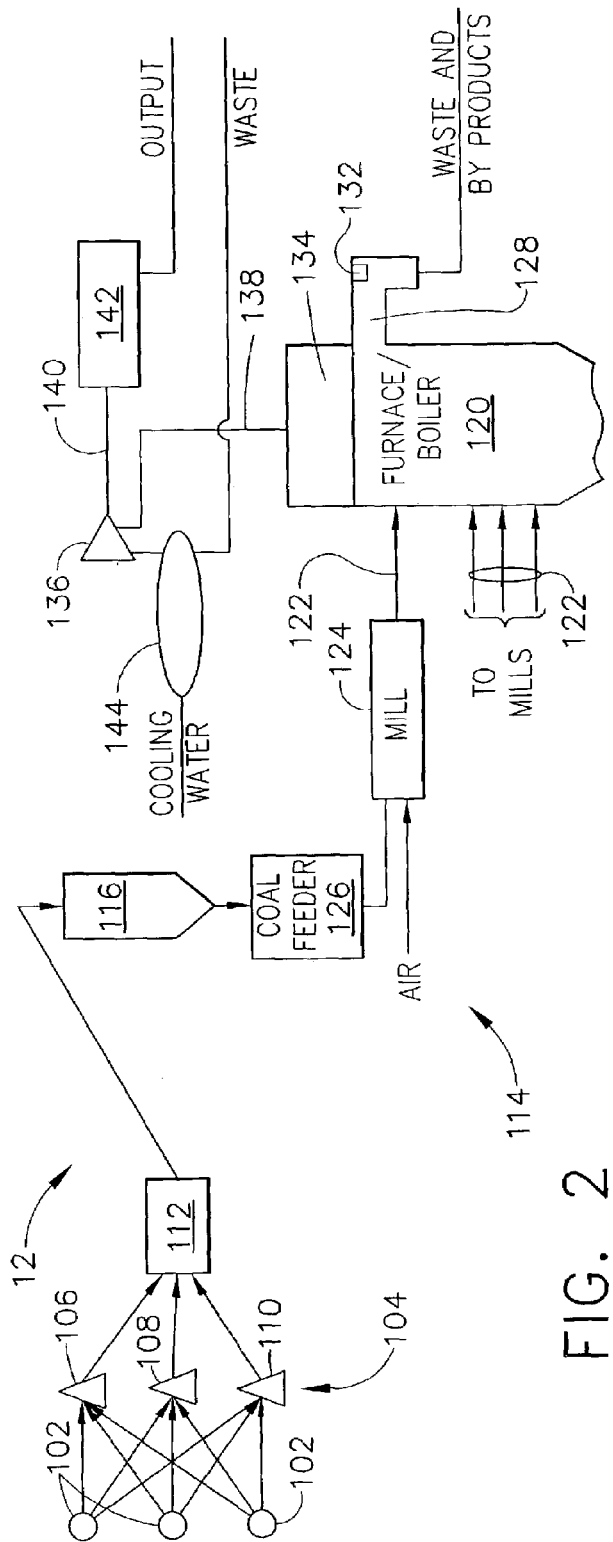
FIG. 2 is a detailed schematic of an exemplary production facility that may be used with the system shown in FIG. 1.

FIG. 2 is a detailed schematic of an exemplary facility 12 that may be used with system 10 (shown in FIG. 1). In the exemplary embodiment, facility 12 produces electrical energy from combusting a fuel, for example, coal. Alternatively, facility 12 may be used to produce other products utilizing other resources. Coal sources 102 route coal to coal yard 104, wherein the coal is sorted in a storage area or coal yard 104, and is segregated into coal piles 106, 108, and 110 of similar quality for storage. Coal quality is determined based on a coal's heat content, usually expressed in BTUs per lbm., quantity of ash and pollutant precursors found within the coal, such as, sulfur, arsenic, lead, and mercury, and based on the quantity of combustion or pollution control aiding constituents, such as sodium within the coal. Coal is transferred from piles 106, 108, and 110 to a blending facility 112 at a rate that forms a fuel blend including a predetermined concentration of coal from each coal pile 106, 108, and 110. The blended coal is then transported to a plant area 114 within facility 12 and stored for immediate use in one or more coal bunkers 116. Known coal bunkers 116 are sized to store between one half day to one and a half days supply of coal for the production process when the process is operating at full capability. Each facility 12 may have a different bunker storage capability depending on the design of each facility 12. Plant area 114 includes a furnace/boiler portion 120 that includes a plurality of burners 122 spaced about the periphery of the boiler at different vertical elevations. Each elevation burner 122 is coupled to a mill 124 that crushes the coal and mixes the pulverized coal with preheated air, and to a coal feeder 126 that supplies coal to mill 124 at a predetermined rate. Furnace/boiler 120 circulates exhaust gases and flyash through backpasses and ductwork 128, which also provides various measured outputs associated with the boiler operation. In addition, exhaust from furnace 120 may contain pollutants, such as, sulphurous oxides ($SO_x$) and nitrous oxides ($NO_x$) and as such, a stack monitor sensor 132 may be included in ductwork 128 for monitoring output of facility 12.

Heat released by the combustion of coal in furnace/boiler 120 heats water in tubes extending around the periphery of furnace/boiler 120 to generate steam. The steam collects in a drum 134 and is directed to a steam turbine 136 through steam pipe 138. The steam is channeled through turbine 136 wherein work is extracted form the steam to turn a shaft 140 coupled to an electric generator 142. Exhausted steam exits turbine 136 and enters a condenser 144 wherein the steam is condensed back to water and then is returned to furnace/boiler 120 to repeat the cycle. Cooling water from an external source (not shown) is circulated though condenser 144 to remove heat from the steam for condensation, then returned to the source.

In operation, coal from piles 106, 108, and 110 is blended based on anticipated facility load and desired operating characteristics of the production process. For example, if a load forecast requests that a facility 12 operate at maximum capability, a higher heat content coal blend may be supplied to facility 12 to achieve a maximum output. Typically, a higher heat content fuel costs more than a lower heat content fuel, and therefore when a load forecast does not require facility 12 to operate at maximum capability, a lesser quality fuel may permit more cost effective operation of facility 12. Typically, coal is transported to bunkers 116 at a rate faster than the coal is combusted in furnace 120. Bunkers 116 are filled and the coal transport system is shut down while coal in the bunkers is used to supply furnace 120. Once deposited in bunkers 116, the coal blend must be supplied to furnace 120 to deplete it. Consequently, there is a time lag associated with a need to change the fuel blend, and a time period before which the blend will reach furnace 120. Accordingly, a load forecast needs to be anticipatory of changing conditions that may necessitate facility 12 to operate at maximum capability to compensate for such time lags.

In the exemplary embodiment, furnace 120 is a "tangentially fired" boiler. However, it should be noted that facility 12 is not limited to a tangentially-fired boiler 1120, but rather other boilers not utilizing tangential firing could be accommodated, such as, but not limited to, a wall-fired boiler or a cyclone boiler. In a tangentially-fired boiler a fireball may be created proximate to burners 122. More specifically, by varying the coal/air feed rates to burners 122, the fireball may be raised or lowered in the furnace. The placement of the fireball may have an effect on the efficiency, or heat rate, the NOx concentration level, and the output of unburned carbon (Loss on Ignition (LOI)). Accordingly, controlling each of these parameters may affect overall heat rate and incremental cost curves for system 10.

Figure 3:
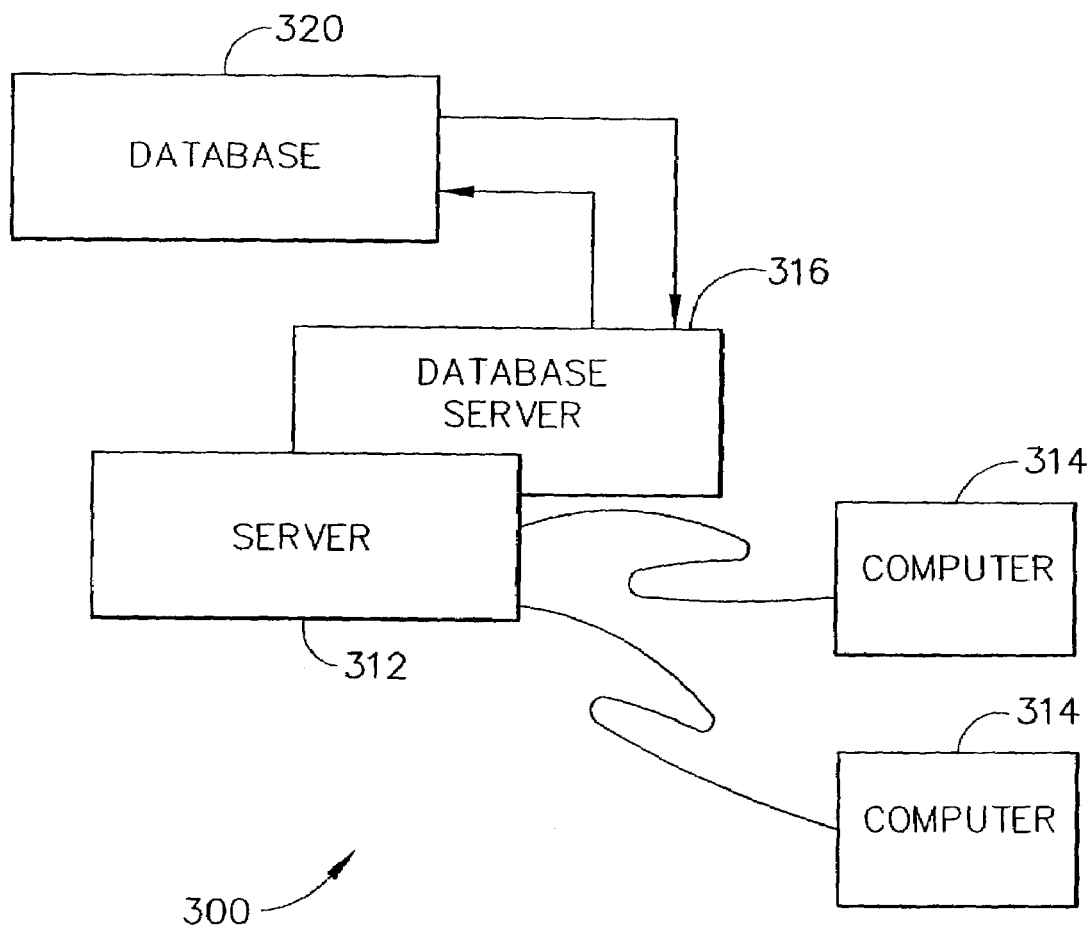
FIG. 3 is a simplified block diagram of a real-time production system economic dispatch system.

FIG. 3 is a simplified block diagram of a real-time production system economic dispatch system 300 including a server system 312, and a plurality of client sub-systems, also referred to as client systems 314, communicatively coupled to server system 312. As used herein, real-time refers to outcomes occurring at a substantially short period after a change in the inputs affecting the outcome. The period is the amount of time between each iteration of a regularly repeated task. Such repeated tasks are called periodic tasks. The time period is a design parameter of the real-time system that may be selected based on the importance of the outcome and/or the capability of the system implementing processing of the inputs to generate the outcome. In the exemplary embodiment, calculations are updated in real-time with a periodicity of one minute. In one embodiment, client systems 314 are computers including a web browser, such that server system 312 is accessible to client systems 314 via the Internet. Client systems 314 are interconnected to the Internet through many interfaces including a network, such as a local area network (LAN) or a wide area network (WAN), dial-in-connections, cable modems and special high-speed ISDN lines. Client systems 314 could be any device capable of interconnecting to the Internet including a web-based phone, personal digital assistant (PDA), or other web-based connectable equipment. A database server 316 is connected to a database 320 containing information regarding a plurality of matters, as described below in greater detail. In one embodiment, centralized database 320 is stored on server system 312 and can be accessed by potential users at one of client systems 314 by logging onto server system 312 through one of client systems 314. In an alternative embodiment database 320 is stored remotely from server system 312 and may be non-centralized.

Figure 4:
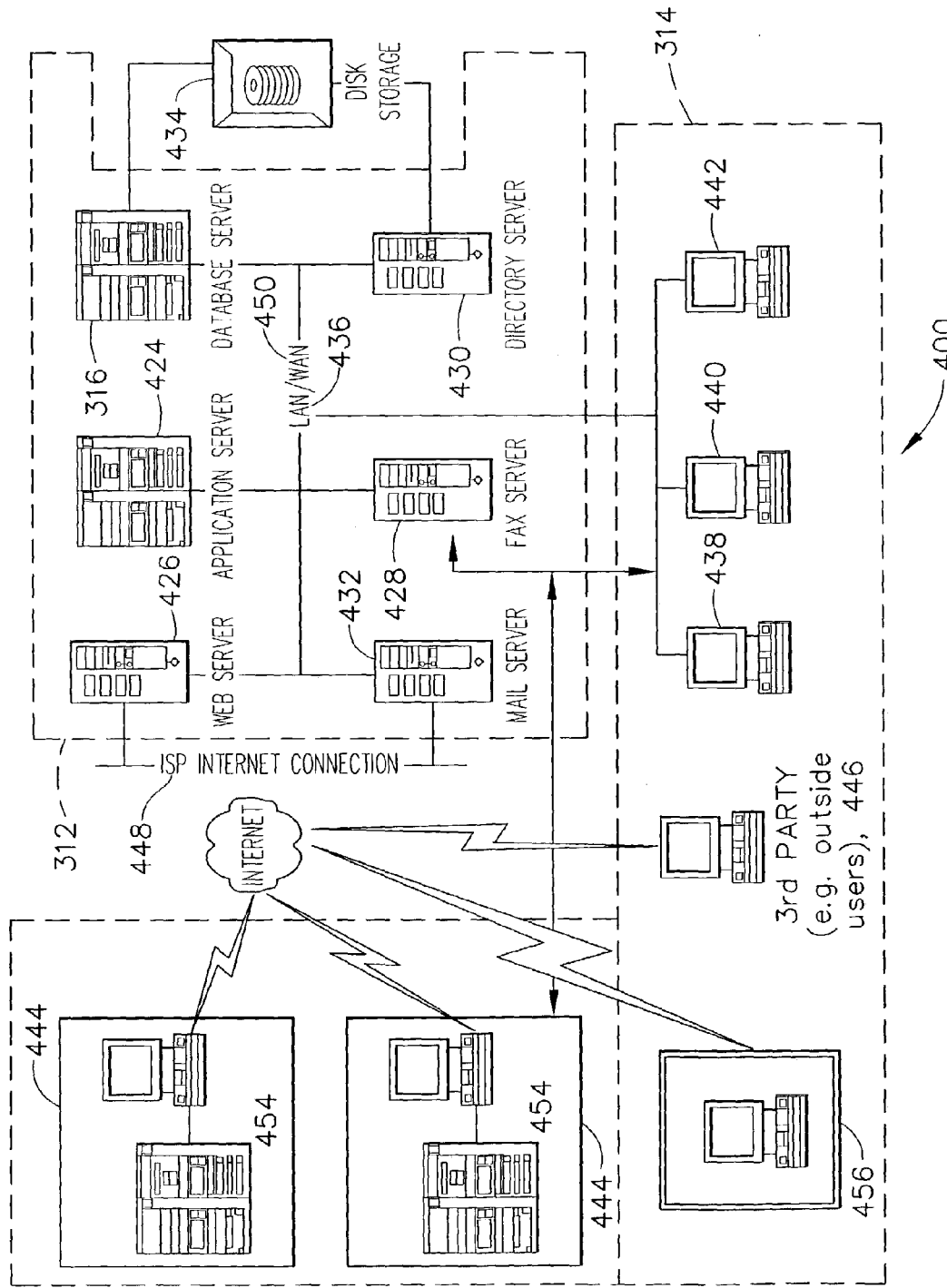
FIG. 4 is an expanded version block diagram of an exemplary architecture of a server system of the real-time production system economic dispatch system shown in FIG. 3.

FIG. 4 is an expanded version block diagram of an exemplary architecture of a server system 400 of the real-time production system economic dispatch system 300 shown in FIG. 3. Components in system 400, that are identical to components of system 300 (shown in FIG. 3), are identified in FIG. 4 using the same reference numerals as used in FIG. 3. System 400 includes server system 312 and client systems 314. Server system 312 further includes database server 316, an application server 424, a web server 426, a fax server 428, a directory server 430, and a mail server 432. A disk storage unit 434 is coupled to database server 316 and directory server 430. Servers 316, 424, 426, 428, 430, and 432 are communicatively coupled in a local area network (LAN) 436. In addition, a system administrator's workstation 438, a user workstation 440, and a supervisor's workstation 442 are coupled to LAN 436. Alternatively, workstations 438, 440, and 442 are coupled to LAN 436 via an Internet link or are connected through an Intranet.

Each workstation, 438, 440, and 442 is a personal computer having a web browser. As used herein, the term computer is not limited to just those integrated circuits referred to in the art as processors, but broadly refers to computers, processors, microcontrollers, microcomputers, programmable logic controllers, application specific integrated circuits, and other programmable circuits. Although the functions performed at the workstations typically are illustrated as being performed at respective workstations 438, 440, and 442, such functions can be performed at one of many personal computers coupled to LAN 436. Workstations 438, 440, and 442 are illustrated as being associated with separate functions only to facilitate an understanding of the different types of functions that can be performed by individuals having access to LAN 436. In an exemplary embodiment, client system 314 includes workstation 346 which can be used by an internal user or a designated outside user to review real-time production system economic dispatch system 300 information relating to the connected system.

Server system 312 is configured to be communicatively coupled to various individuals, including dispatchers 444 and to third parties, e.g., designated outside users, 446 via an ISP Internet connection 448. The communication in the example embodiment is illustrated as being performed via the Internet, however, any other wide area network (WAN) type communication can be utilized in other embodiments, i.e., the systems and processes are not limited to being practiced via the Internet. In addition, and rather than WAN 450, local area network 436 could be used in place of WAN 450.

In the example embodiment, any authorized individual having a workstation 454 can access real-time production system economic dispatch system 300. At least one of the client systems includes a manager workstation 456 located at a remote location. Workstations 454 and 456 are personal computers having a web browser. Also, workstations 454 and 456 are configured to communicate with server system 312. Furthermore, fax server 428 communicates with remotely located client systems, including a client system 456 via a telephone link. Fax server 428 is configured to communicate with other client systems 438, 440, and 442 as well.

Figure 5:
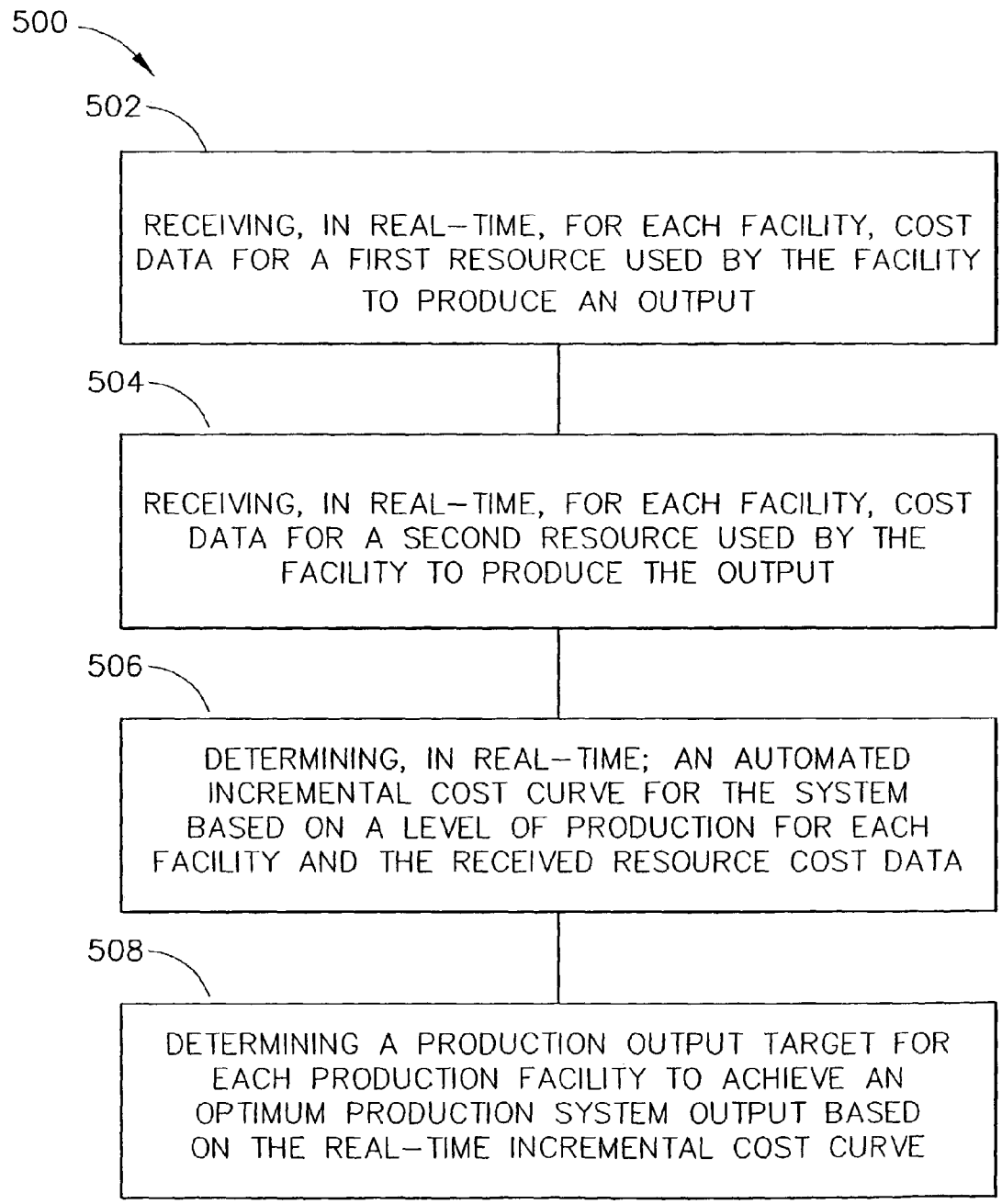
FIG. 5 is a flow chart illustrating an exemplary method for operating the production system shown in FIG. 1.

FIG. 5 is a flow chart illustrating an exemplary method 500 for operating a production system, such as system 10 (shown in FIG. 1). The production system includes one or more production facilities whose operation is coordinated by a computer system that executes a software code segment based on inputs received from each facility. More specifically, the computer system receives 502, in real-time, cost data relating to a first resource used by the facility to produce an output. In the exemplary embodiment, the first resource data is received 502 using a stand-alone commercial software product, such as, Coalogic®, commercially available from General Electric Company, Fremont Hills, Calif. In an alternative embodiment, the first resource data is received 502 from a pre-existing distributed control system (DCS) (shown in FIG. 1) through a custom interface.

The first resource may be received at each facility at a rate substantially equal to a rate the resource is used at the facility. For example, when the first resource is a fuel resource, such as natural gas the first resource may be received at the facility at approximately the same rata the resource is used at the facility. Alternatively, the first resource may be received at each facility at a rate in excess of the utilization rate, such as, for example, when the first resource is a fuel resource such, as coal.

Cost data received 502 includes, but is not limited to receiving fuel quality data, such as, fuel heat content, pollutant content, and by-product content, fuel transport costs, and/or fuel handling costs. The fuel quality is a factor in determining the output capability of the production facility. The fuel system transit time may be a measure of short-term coal quality, in that coal already deposited in the bunkers must be utilized in the furnace at the current rate of utilization before coal of higher quality can be supplied to the furnace. As such, typically, there is a time lag between when a decision is made to improve the coal quality and when the higher quality coal reaches the furnace. Such a determination is based on several factors including, for example, blending time, pipeline transit time, and bunker transit time. Blending time includes time allocated for moving coal from each segregated pile to the blending facility. Pipeline considers the time the coal spends in the classifier or crusher and time on the conveyor belt. Typically, blending time and conveyor transit times are relatively short in relation to bunker transit time. For example, bunker transit time may be on the order of tens of hours.

The software code segment receives 504, in real-time, cost data for a second resource used by each facility to produce the desired output. In the exemplary embodiment, the second resource includes known coal-fired power plant components communicatively coupled to a DCS that monitors the operation of the power plant components and reports component health anomalies that may impact the overall operation of the system. Cost data for power plant components is based on several factors including facility heat rate, facility auxiliary load, production equipment availability, a time period required to make production equipment available, a cost to make production equipment available, and production system fixed and variable costs attributable to the facility. The software code segment includes standard and/or custom modules programmed to interface with online distributed control systems (DCS) such that the heat rate may be calculated automatically and on a continuous basis for input into the production optimization software. For example, a predictor module may predict a future output capability of the facility based on facility ramp rate, the time period required to make production equipment available, fuel system transit time, an amount of fuel stored at the facility, and the current fuel usage rate or a "what-if" fuel usage rate.

The software code segment determines 506, in real-time an automated incremental cost curve for the system based on a level of production for each facility and the received resource cost data. The software code segment also determines 508 a production output target for each production facility to achieve an optimum production system output based on the real-time incremental cost curves.

Figure 6:
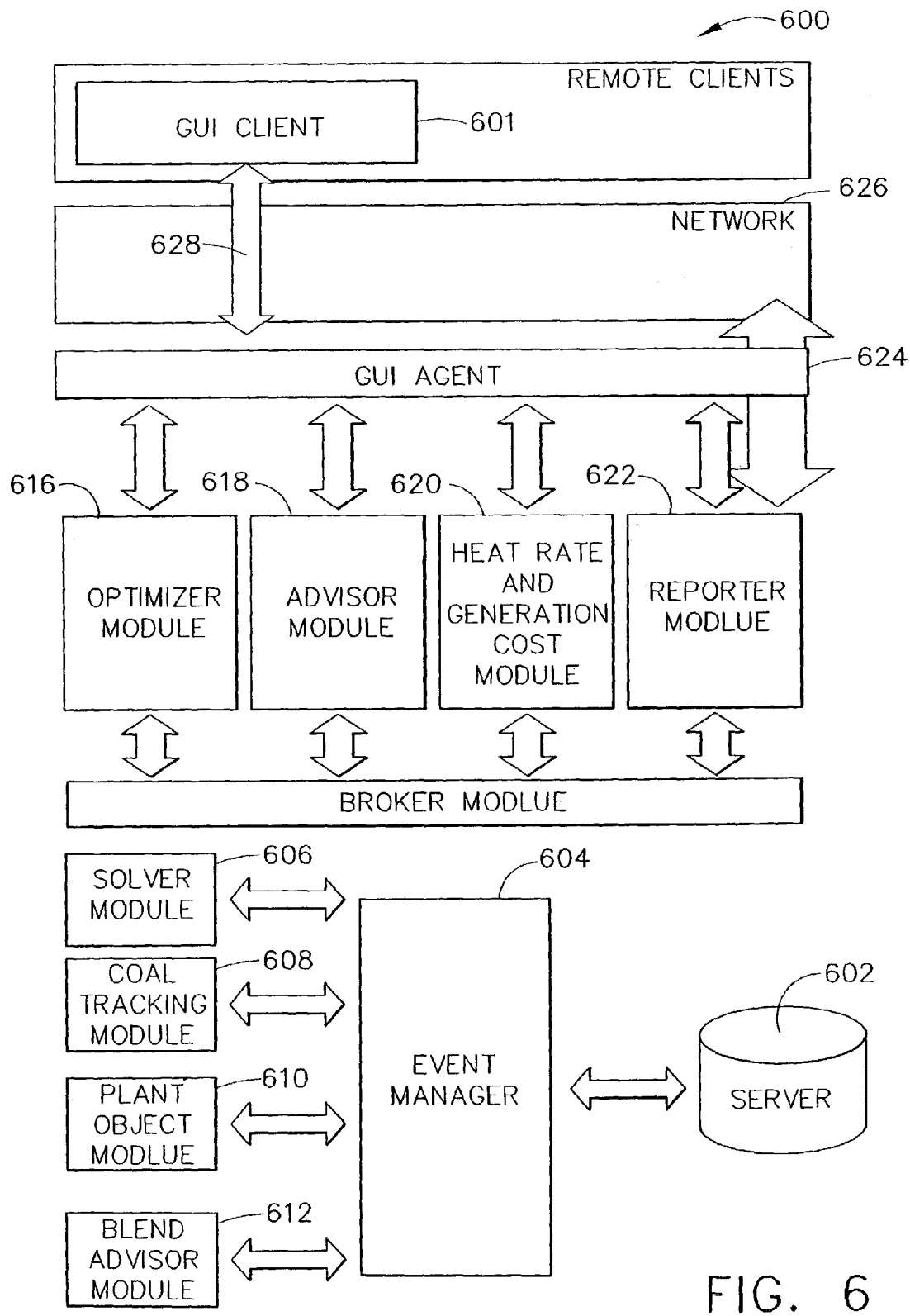
FIG. 6 is an exemplary architecture block diagram of a software code segment that implements the real-time production system economic dispatch system shown in FIG. 3.

FIG. 6 is an exemplary architecture block diagram of a software code segment 600 that implements real-time production system economic dispatch system 300 shown in FIG. 3. Software code segment 600 is a client-server product, with a standalone Graphical User Interface (GUI) 601 that provides a user-friendly interface to dispatch system 300. More specifically, GUI 601 interfaces with existing dispatch management software, and transmits accurate real-time data to improve generation decisions. GUI 601 includes integrated Fuel Tracking Technology, which allows accurate monitoring of track as they move through the yard to the boiler. Furthermore, the fuel tracking technology also enables GUI 601 to perform facility performance calculations, such that, accurate real-time and projected heat rate calculations may be performed at any load, based on detailed on-line heat balance modeling.

Real-time production system economic dispatch system 300 includes a central computer system 28 that executes software code segment 600. Furthermore, computer system 28 is programmed to determine, for each production facility in the production system, real-time economic dispatch control curves, real-time fuel quality, fuel cost, heat rate curves, and generation data for dispatch decisions, short and long term projections of fuel quality, fuel cost, heat rate, and generation data utilizing a "what-if" projector tool, and pertinent information for use during emergency response situations, such as when fuel loading equipment breaks down.

A data storage device 602 may include hard disk magnetic or optical storage units, as well as CD-ROM drives and/or flash memory. Data storage device 602 includes databases used in the processing of transactions between various components of economic dispatch system 300, including an event manager 604 that is programmed to exchange data with at least one data storage device 602. In the exemplary embodiment database software such as SQL Server, manufactured by Microsoft Corporation, is used to create and manage these databases.

Event Manager 604 coordinates data flow between a solver module 606, a fuel tracking module 608, a plant object module 610, and a blend advisor module 612, and a broker module 614. Broker module 614 is programmed to exchange data with an optimizer module 616, an advisor module 618, a heat rate and generation cost module 620, and a reporter module 622. A GUI agent 624 may be communicatively coupled to optimizer module 616, advisor module 618, heat rate and generation cost module 620 and reporter module 622. Reporter module 622 is communicatively coupled to a network 626 and is programmed to upload reporter module output to server 602. GUI agent 624 is also communicatively coupled to a remote client 601 through a secure HTTP tunnel using extended network management protocol (ENMP).

Figure 7:
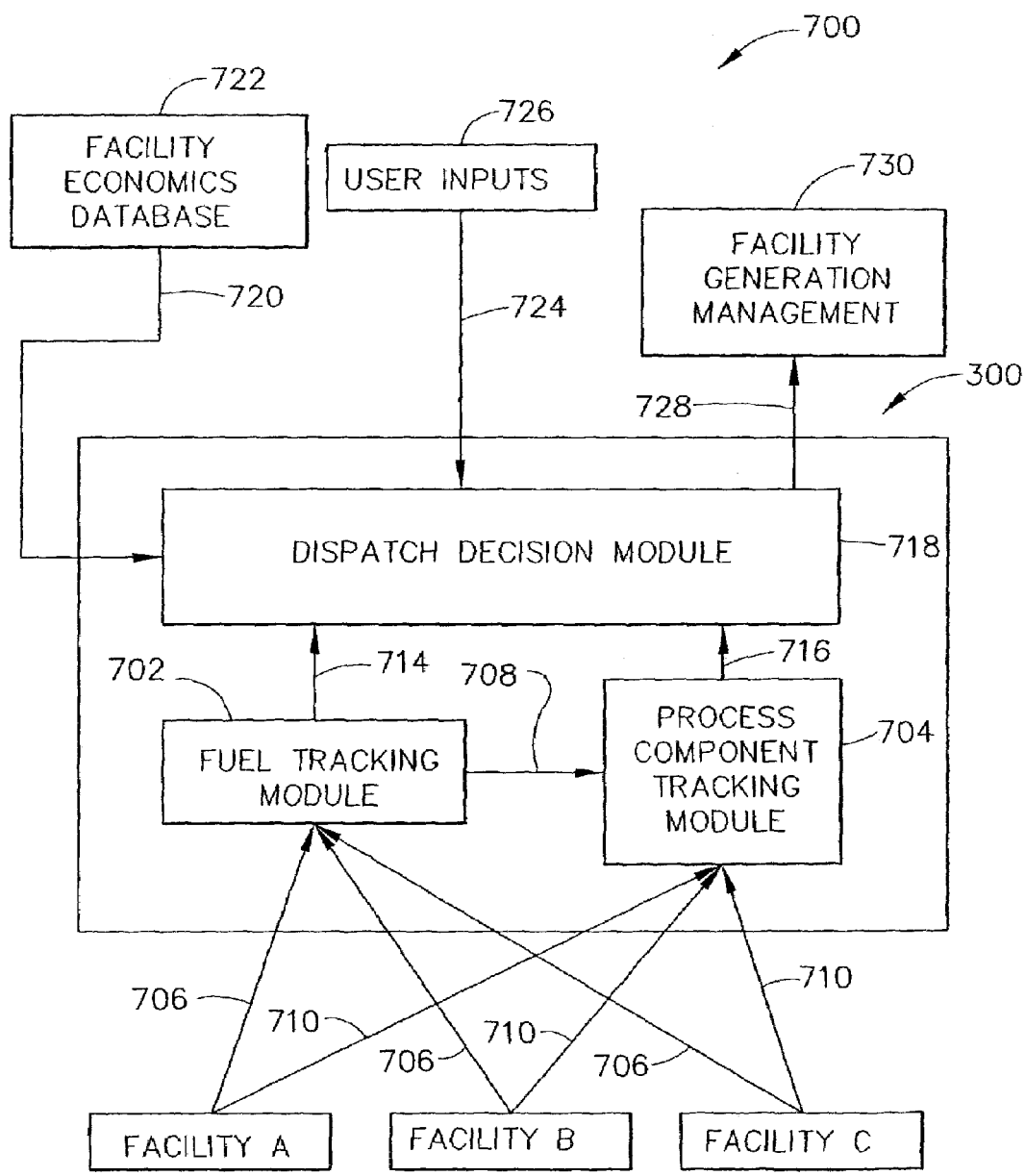
FIG. 7 is an exemplary data flow block diagram of an overview of software code segment that implements real-time production system economic dispatch system shown in FIG. 3.

FIG. 7 is an exemplary data flow block diagram 700 of an overview of software code segment 600 that implements real-time production system economic dispatch system 300 (shown in FIG. 3). Economic dispatch system 300 includes data receiving modules, such as, for example, a fuel tracking module 702 and a process component tracking module 704. Fuel tracking module 702 receives fuel and yard data 706 from each facility 12 in production system 10 (shown in FIG. 1), such as, for example, fuel quality, fuel storage quantity, fuel feed rate capability, and fuel supply equipment health, such as crusher and conveyor availability. Fuel tracking module 702 receives data 706 in real-time from on-line monitoring systems and/or periodically from manual input sources and/or periodic reports from automated systems. From data 706, fuel tracking module 702 determines real-time fuel cost and quality data by monitoring fuel flow from coal yard 104 to bunkers 116 and maintaining blending concentrations of fuel in bunkers 116.

Process component tracking module 704 receives real-time fuel quality and fuel property data 708 from fuel tracking module 702 and real-time plant component operational data 710 from on-line DCS 24 and/or stand alone monitoring systems and manual data input at each facility to supply detailed component and production process system models executing within module 704. The models monitor real-time data 710 across a load range of production facility 12 range, facility load capacity and fuel quality to generate real-time facility heat rate curves.

Real time fuel cost and fuel quality data 714 from fuel tracking module 702 and real-time heat rate curves 716 from process component tracking module 704 from facilities 12 are transmitted to a dispatch decision module 718. Additionally, module 718 receives fuel data 720 from a facility economics database 722, including information pertaining to fuel types, fuel properties and fuel costs. Module 718 also receives facility data and operations and maintenance costs 724 from a user input module 726. Module 726 may include corporate financing, support and miscellaneous costs attributable to each facility but not available through facility systems or databases. For example, such data may include facility specific data, emissions cost factors, and fixed and variable costs.

Dispatch decision module 718 integrates real-time fuel quality and cost, real-time heat curves, and facility plant operation and maintenance costs to generate real-time dispatch cost curves that may be used to facilitate optimizing operation of system 10, such that a system-wide least cost dispatch strategy is facilitated based on individual facility economics, facility optimization, and pro-active dispatch decision-making. Dispatch decision module 718 generates dispatch cost curves and related cost data 728 to a facility generation management module 730. Data 728 may include Incremental Cost Control Curves, which illustrate the incremental cost of facility operations as a function of load or output for each facility within production system 10, Fuel Heating Values, which are the real-time mass-averaged heating values for fuel entering furnace/boiler 120 for each facility 12; Fuel Costs, which are the real-time mass-averaged cost for fuel entering furnace/boiler 120 for each facility 12, Heat Rate Curves, generated as are real-time heat rate at any load based on detailed on-line heat rate models and component data, and Maximum MW Producible, which indicates a maximum output producible by each facility and is calculated based on the mass-averaged heating value entering furnace/boiler 120, the calculated heat rate, and the calculated maximum feed rate for each mill 124 based on the current fuel running through mill 124. These calculations are updated periodically, for example, every minute and can either be transmitted to DCS 24 or to a plant historian, wherein dispatch control software can access them, or transmitted directly to the dispatch control software via WAN 450.

Dispatch cost curves and related cost data 728 may also be used to improve Automatic Generation Control (AGC) and general dispatch decisions. AGC represents short-term corrections in the load to be generated for facilities units that have been placed in that mode of operation. AGC corrections are typically made on the order of every second.

Economic dispatch system 300 is configurable to provide input for "what if" scenarios through its What-If Projector functionality. The What If Projector can be used to determine and display short and long term projections for fuel quality, costs and operational data for future time periods, such as, up to the next twenty-four hours. For each facility in production system 10, economic dispatch system 300 provides the ability to run short-term projections of the upcoming fuel quality, fuel cost, and heat rate. Using this tool, the user will be able to see values for any fuel quality parameter tracked by economic dispatch system 300, including cost, as well as projected heat rate in both graphical and tabular format over the time required for the current bunker contents to empty based on an entered load profile. Long-term projections are similar to short-term projections but extend the projection up to 24 hours in the future, using a modeling of a fuel loading. This tool can be used to estimate the impacts of loading any potential fuel source into any of the facilities' bunkers. In the exemplary embodiment, the user is provided with multiple means to enter projected load profiles, fuel sources to be loaded, and timing for the loading.

Economic dispatch system 300 provides as output from the projection functionality, Projected Fuel Properties, which are the mass-averaged properties for the fuel entering furnace/boiler 120 for each facility projected over the desired time period, Projected Fuel Cost, which is the mass-averaged cost for the fuel entering furnace/boiler 120 for each facility projected over the time period, and Projected Heat Rate, which is averaged heat rate based on detailed on-line heat rate modeling over the time period.

Economic dispatch system 300 is configurable to provide input for emergency response scenarios through its Emergency Response Data functionality. The Emergency Response Data functionality provides a user with important information for use during emergency response situations, such as, component breakdown that affects fueling the facility or the output capability of the facility. Emergency response data provides information about how much fuel is remaining in each bunker, how long it will last at the current or a projected facility load, how quickly a change in fuel quality can be made, and how much output each facility can assume. The information that is calculated and displayed in a GUI client display includes Bunker Maximum Power Potential, which is the maximum power that the facility can achieve under the current conditions and available fuel in bunkers 116; Bunker Response Time, which is the number of hours that will elapse before a new fuel loaded immediately into the bunker would reach the burners, such as would occur if greater output is desired from a unit since it specifies how long it would be before a premium fuel could reach the burners; Bunker Burn Time, which is the number of hours the system could run at the maximum capability before new fuel must be added to the bunker.

While the present invention is described with reference to a system of coal-fired power plants, numerous other applications are contemplated. It is contemplated that the present invention may be applied to any system of production facilities, including a facilities that produce fluid outputs, such as, refineries and midstream liquids facilities, and facilities that produce discrete product outputs, such as, factories.

The above-described real-time production system economic dispatch system is cost-effective and highly reliable system for dispatching production system resources. More specifically, the methods and systems described herein facilitate determining facility output capabilities during various operating conditions and the real-time costs associated with those operations. In addition, the above-described methods and systems facilitate providing increased data to system operators for judging the health and emergency response capability of the system. As a result, the methods and systems described herein facilitate reducing operating costs in a cost-effective and reliable manner.

Exemplary embodiments of real-time production system economic dispatch systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method for operating a production system that includes a plurality of production facilities, said method comprising:

continuously receiving, without perceived delay, for each facility, cost data for a first resource used by each respective facility to produce an output;

continuously receiving, without perceived delay, for each facility, cost data for a second resource used by each respective facility to produce the output;

continuously determining, without perceived delay, an automated incremental cost curve for the system based on a level of production of each facility and the received resource cost data; and determining a production output target for each production facility to achieve an optimum production system output based on the continuously determined incremental cost curves.

2. A method in accordance with claim 1 further comprising receiving a first resource at each facility at a rate that is substantially equal to a rate the resource is used at the respective facility.

3. A method in accordance with claim 1 further comprising storing an amount of the first resource at the facility in excess of an amount of the first resource used at the respective facility.

4. A method in accordance with claim 1 wherein receiving cost data for a first resource comprises receiving at least one of fuel quality data, fuel transport costs, and fuel handling costs from each respective facility.

5. A method in accordance with claim 4 wherein receiving at least one of fuel quality data comprises receiving at least one of fuel heat content, pollutant content, and byproduct content from each respective facility.

6. A method in accordance with claim 4 further comprising determining a production facility output capability based on fuel quality of fuel supplied to each respective facility.

7. A method in accordance with claim 6 wherein determining a production facility output capability comprises determining a fuel system transit time for each respective facility.

8. A method in accordance with claim 7 wherein determining a fuel system transit time comprises determining at least one of a blending time, a pipeline transit time, and a bunker transit time for each respective facility.

9. A method in accordance with claim 1 wherein receiving cost data for a second resource comprises receiving at least one of a facility heat rate, a facility auxiliary load, a production equipment availability, a time period required to make production equipment available, a cost to make production equipment available, and production system fixed and variable costs attributable to each respective facility.

10. A method in accordance with claim 9 wherein receiving a facility heat rate comprises receiving a facility heat rate from an online distributed control system (DCS) at each respective facility.

11. A method in accordance with claim 1 further comprising predicting a future output capability of a facility based on at least one of a facility ramp rate, a time period required to make production equipment available and a fuel system transit time.

12. A method in accordance with claim 1 further comprising determining a facility output capability based on an amount of fuel stored at the facility and at least one of a current fuel usage rate of the facility and a second fuel usage rate wherein the second usage rate is different than the current usage rate.

13. A method in accordance with claim 1 wherein determining, in real-time; an automated incremental cost curve further comprises determining, in real-time, the incremental cost of production system operations as a function of load for each facility within a utility system.

14. A method in accordance with claim 1 further comprising determining a fuel heating value in real time wherein the fuel heating value includes the mass-averaged heating value for the fuel entering the boiler for each respective facility.

15. A method in accordance with claim 1 further comprising continuously determining a fuel cost in wherein fuel cost is a mass-averaged cost for the fuel entering the boiler for each respective facility.

16. A method in accordance with claim 1 further comprising determining a facility heat rate curve wherein real-time heat rate at any load is based on detailed on-line heat rate data.

17. A production system for producing an output comprising: at least one production facility comprising a first resource receiving system, and a second resource configured to control and utilize said first resource in a production process; and a computer system programmed to continuously determine, without perceived delay, an incremental cost of said first resource at each respective facility based on a level of production of said facility.

18. A production system in accordance with claim 17 wherein said software code segment comprises an event manager programmed to exchange data with at least one of an SQL server, a solver module, a fuel tracking module, a plant object module, a blend advisor module, and a broker module.

19. A production system in accordance with claim 18 wherein said broker module is programmed to exchange data with at least one of an optimizer module, an advisor module, a heat rate and generation cost module and a reporter module.

20. A production system in accordance with claim 18 further comprising a GUI agent communicatively coupled to at least one of the optimizer module, the advisor module,, the heat rate and generation cost module and the reporter module.

21. A production system in accordance with claim 20 wherein said reporter module is communicatively coupled to a network and programmed to upload reporter module output to a server.

22. A production system in accordance with claim 20 wherein said GUI agent is communicatively coupled to a remote client through a secure HTTP tunnel using extended network management protocol (ENMP).

23. A software code segment for controlling a computer to continuously determine, without perceived delay, an incremental cost of operating a plurality of production facilities based on a first resource input to each respective facility and a second resource utilization of the first resource at each respective facility, said incremental cost based on a level of production of each said respective facility, said segment including:

a fuel tracking module programmed for continually tracking, without perceived delay, at least one of fuel cost, fuel flow, and fuel quality for each respective facility;

a process component tracking module for modeling facility components to continuously generate, without perceived delay, heat rate curves for each respective facility; and a dispatch decision module programmed to receive inputs from at least one of said fuel tracking module, said process component tracking module, and said dispatch decision module configured to continuously generate, without perceived delay, system dispatch cost curves.

24. A software code segment in accordance with claim 23 wherein said dispatch decision module is further configured to receive data from a facility economics database.

25. A software code segment in accordance with claim 24 wherein said facility economics database includes at least one of fuel type data, fuel property data, and fuel cost data.

26. A software code segment in accordance with claim 23 wherein said dispatch decision module is further configured to receive data from a user input module.

27. A software code segment in accordance with claim 26 wherein said user input module includes unit specific data, emission cost factors, and fixed and variable costs attributable to each respective facility.

28. A software code segment in accordance with claim 23 programmed to generate dispatch commands for an automatic generation control (AGC) system at each respective facility.

29. A software code segment in accordance with claim 23 programmed to generate dispatch recommendations for each respective facility that facilitates optimizing the overall heat rate for said plurality of production facilities.

30. A software code segment in accordance with claim 23 programmed to generate dispatch recommendations for each facility that facilitates optimizing responding to a breakdown at least one of said plurality of production facilities.

* * * * *